April 30, 1968
W. USINGER
3,380,605
REMOVAL DEVICE FOR MOLDED ARTICLES MADE
OF PLASTICS FROM A MOLDING DEVICE
Filed June 28, 1966
2 Sheets-Sheet 1
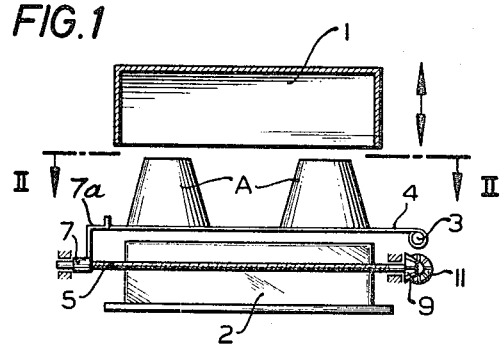
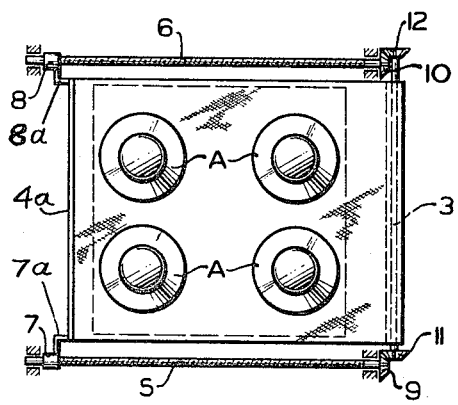
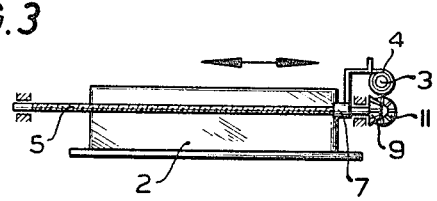
INVENTOR:
Walter Usinger
by Singer, Stern &
Carlberg, Attorneys.

:3,380,605
REMOVAL DEVICE FOR MOLDED ARTICLES MADE OF PLASTICS FROM A MOLDING DEVICE
Walter Usinger, Wehen, Taunus, Germany, assignor to Erich Lendle & Co., Wehen, Taunus, Germany, a corporation of Germany
Filed June 28, 1966, Ser. No. 561,077
Claims priority, application Germany, July 6, 1965, L 51,055
5 Claims. (Cl. 214—300)

ABSTRACT OF THE DISCLOSURE

A device for removal of lightweight articles formed in a molding device, comprising a band adapted to be unwound from and wound upon a roller rotatably mounted adjacent to said molding device, for insertion of said band into the space between a core box and a superimposed mold box of said molding device and withdrawal of said band from said space to permit said articles to be deposited upon said band from said mold box and to be removed from said space upon withdrawal of said band.

---

The invention relates to a device for removing molded articles made of plastics from a molding device consisting of a molding box and a core box.

The necessity to remove molded articles quickly from a molding device is particularly then indicated, when the molding operation takes place in a semiautomatically or fully automatically operating molding machine. In such a situation it is necessary that the molded articles be removed before the opened mold closes again for the next molding operation.

It has already been proposed to provide a removal device comprising a plate on which the molded articles are deposited after they have been ejected from the mold, whereupon this plate, which was inserted into the opened mold between the separated core box and mold box is moved with the articles thereon away from the molding device.

This known device has proved quite useful, however, it is necessary to have available adjacent the molding device a space having at least the size of the plate. Furthermore, still an additional device is necessary for stripping the molded articles from the plate or for tilting the plate, so that the molded articles drop into a container or onto a conveyor.

It is an object of the present invention to provide a removal device for molded articles made of plastics, in which in the simplest manner a removal of the molded articles is insured with the least space requirement.

The removal device of the invention is provided with a removable stretched band capable of being wound up and being inserted and removed from the space formed between the separated core box and molding box, so that said band serves as a conveyor table for the molded articles ejected from the mold box.

Such a removal device has the advantage that adjacent to the molding device practically no space is required for the removal device, and furthermore, the molded articles when removed by the band may at once or automatically drop into a suitable container placed beneath the wound up band.

The invention will now be explained in more detail with reference to the accompanying drawings, in which by way of example two embodiments are diagrammatically illustrated.

FIG. 1 illustrates one embodiment in side elevation view, partly in section, with the band in operative position;

FIG. 2 is a top elevation view along the line II—II of FIG. 1;

FIG. 3 is a side elevation view similar to FIG. 1, but with the band in inoperative position, namely wound upon a roller; and the FIGS. 4 and 5 illustrate each in a perspective view another embodiment of a removal device in inoperative and operative positions respectively.

Figure 4:
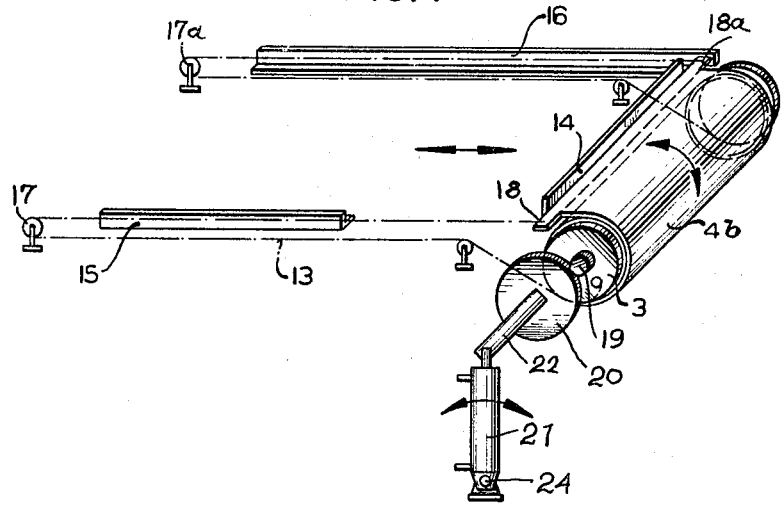

Referring to the drawings, the FIGS. 1 and 3 illustrate a molding device consisting of an upper mold box 1 and a lower core box 2. Both these figures show the device in a position in which the mold box 1 has been raised from the core box 2. In order to be able to remove the molded articles A, the invention provides a band 4 which is horizontally insertable between the two separated boxes 1 and 2 of the device and is capable of being wound upon a roller 3 arranged adjacent the molding device. For the insertion and removal of the band 4 are used two spaced parallel threaded spindles 5 and 6 arranged on two opposite sides of the core box 2 and on which nut members 7 and 8 travel which by means of brackets 7a and 8a are attached to the free end 4a of the band 4. For the rotation of the threaded spindles 5 and 6 serve the bevel gears 9 and 10 meshing with the bevel gears 11 and 12 attached to the ends of the roller 3, whose axis extends transversely to the axes of the threaded spindles 5 and 6. The shaft of the roller 3 may be driven in any desired manner, for example by means of a reversible electromotor or a pneumatic motor with the assistance of cone belts, gearings, friction drives or the like.

FIG. 1 shows the removal device in operative position in which the horizontally disposed band 4 has been moved between the separated boxes 1 and 2 and has deposited thereon from the mold box 1 the molded articles A. FIG. 3 shows the band 4 in an inoperative position, namely wound upon the roller 3.

During removal of the articles A, the band 4 is wound upon the roller 3, and the molded articles drop automatically from the wound up band into a container or onto a conveyor belt.

It may also be mentioned that for the drive of the threaded spindles 4 and 5 may also be used gear racks, pneumatic or hydraulic cylinders.

Figure 5:
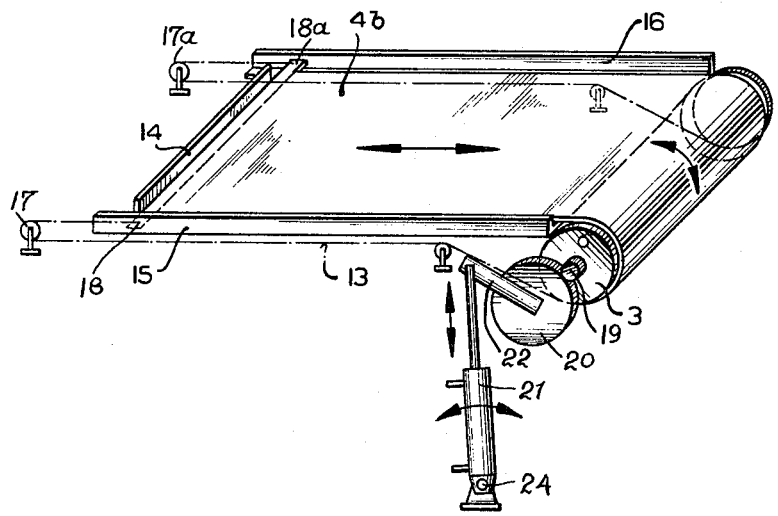

According to the embodiment shown in the FIGS. 4 and 5, the band 4b may also be moved by a cable drive 13, which in turn is operated by means of pneumatic or hydraulic cylinders with the assistance of gearings and friction wheel drives.

The front end of the band 4b has a rail 14 attached thereto, the two ends of this rail 14 are guided in angle iron bars 15 and 16 extending parallel to the sides of the core box 2. One end of the cables 13, 13a is attached at 18, 18a to the free end of the band 4b, and the other end of these cables is attached to the drum 3. When the drum 3 is rotated anti-clockwise, the band 4 is pulled toward the left, since the cables 13, 13a are guided at the lefthand end over guide rollers 17, 17a and from the latter back to the roller 3. The roller 3 is driven by intermeshing gears 19, 20 of which the gear 19 is arranged coaxially with the axis of rotation of the roller 3. The gear 20 is driven by a lever 22 operated by the hydraulic cylinder 21 pivotally supported at one end at 24.

The embodiments of the removal device in accordance with the invention have the great advantage that the space requirement for the same is small, because no excessively projecting parts are employed and the entire area below the mold box is covered by the band to receive the molded articles.

As material for the band 4 may be used for example linen, synthetic foils or rubber.

What I claim is:

1. A removal device for lightweight articles formed in a molding device comprising a core box and a superimposed mold box separable therefrom by relative vertical movement of said boxes, said removal device comprising a roller rotatably mounted in a horizontal position adjacent said molding device, a flexible band having a free front edge and adapted to be selectively wound on said roller and unwound therefrom depending upon the direction of rotation of said roller, and operating means extending transversely of said roller along two opposite sides of said molding device and being operatively connected with said roller and said front edge of the band in such a manner that rotation of said roller causes said front edge of the band to move forwardly and rearwardly depending upon the direction of rotation of said roller to unwind the band from the roller and wind it upon the same, thereby moving said band into and out of the space between said boxes when separated to receive and remove said articles when freed from said mold box.

2. A removal device as set forth in claim 1, in which said operating means comprises two rotatably and non-displaceably mounted threaded spindles, means secured to said front edge of the band and including nuts in threaded engagement with said threaded spindles, and means connected with said threaded spindles for driving the same in synchronism with each other.

3. A removal device as set forth in claim 2, including transmission means connecting said last-mentioned means with said roller for driving said roller in synchronism with said threaded spindles.

4. A removal device as set forth in claim 2, including spring means connected with said roller for continuously urging said roller in the band take-up direction.

5. A removal device as set forth in claim 1, in which said operating means comprises two cables each having one end secured to said front end of the band and the other end secured to said roller, and stationarily mounted guide means for said cables forwardly of said front edge of the band when in unwound position.

References Cited

UNITED STATES PATENTS

| | | | |
|---|---|---|---|
| 2,321,252 | 6/1943 | Sayre | 18—16 |
| 3,327,877 | 6/1967 | Niepmann | 214—307 |

HUGO O. SCHULZ, *Primary Examiner.*